(12) United States Patent
Allmer et al.

(10) Patent No.: US 8,286,417 B2
(45) Date of Patent: Oct. 16, 2012

(54) DIAGNOSIS METHOD FOR AN EXHAUST GAS POST-TREATMENT SYSTEM

(75) Inventors: Ingo Allmer, Strattegg (AT); Holger Huelser, Graz (AT); Arno Huss, Graz (AT)

(73) Assignee: AVL List GmbH

( * ) Notice: Subject to any disclaimer, the term of this patent is extended or adjusted under 35 U.S.C. 154(b) by 1501 days.

(21) Appl. No.: 11/792,398

(22) PCT Filed: Jan. 19, 2006

(86) PCT No.: PCT/AT2006/000029
§ 371 (c)(1),
(2), (4) Date: Jun. 6, 2007

(87) PCT Pub. No.: WO2006/081598
PCT Pub. Date: Aug. 10, 2006

(65) Prior Publication Data
US 2008/0103684 A1 May 1, 2008

(30) Foreign Application Priority Data

Feb. 3, 2005 (AT) .................. A 177/2005
Mar. 3, 2005 (AT) .................. A 362/2005

(51) Int. Cl.
*F01N 3/00* (2006.01)
(52) U.S. Cl. ................ 60/277; 60/274; 60/276; 60/278; 60/286; 60/295; 60/301; 60/303
(58) Field of Classification Search .................. 60/274, 60/276, 277, 286, 295, 301, 303, 278
See application file for complete search history.

(56) References Cited

U.S. PATENT DOCUMENTS
6,363,771 B1  4/2002  Liang et al.
(Continued)

FOREIGN PATENT DOCUMENTS
DE  10261877  6/2004
(Continued)

OTHER PUBLICATIONS
English Abstract of JP 2003161145.

*Primary Examiner* — Binh Q Tran
*Assistant Examiner* — Diem Tran
(74) *Attorney, Agent, or Firm* — Dykema Gossett PLLC

(57) ABSTRACT

The invention relates to a diagnosis method for an exhaust gas post-treatment system for the reduction of nitric oxides in the exhaust gas train of an internal combustion engine by means of selective catalytic reduction. The following steps are provided for easy recognition of errors: definition of at least one threshold value for the $No_x$ concentration for at least one engine operation point; shifting the operational mode of the internal combustion engine into an operational state of diagnosis, wherein in the operational state of diagnosis substantially more $No_x$ emissions are produced than in the normal operational mode; determining an amount of reducing agents corresponding to the increased amount of $No_x$ emisions in the operational state of diagnosis; controlling a dosing device in order to introduce the amount of reducing agents, corresponding to the increased amount of $NO_x$ emissions during the operational state of diagnosis, into the wase gas; measuring the concentration of $NO_x$ downstream from the post-treatment device; comparing the measured concentration of $NO_x$ to the threshold value; taking a decision as to the erroneous or error-free operation of the waste gas post-treatment system based on comparison of the measured concentration of $NO_x$ to the threshold value; terminating the operational state of diagnosis.

6 Claims, 3 Drawing Sheets

U.S. PATENT DOCUMENTS

| | | | |
|---|---|---|---|
| 6,367,320 B1 * | 4/2002 | Kueper et al. | 73/114.71 |
| 6,539,705 B2 * | 4/2003 | Beer et al. | 60/274 |
| 6,701,707 B1 * | 3/2004 | Upadhyay et al. | 60/277 |
| 7,093,427 B2 * | 8/2006 | van Nieuwstadt et al. | 60/286 |
| 7,134,273 B2 * | 11/2006 | Mazur et al. | 60/286 |
| 7,150,144 B2 * | 12/2006 | Nakagawa et al. | 60/277 |
| 7,500,356 B2 * | 3/2009 | Hirata et al. | 60/286 |
| 2004/0040289 A1 | 3/2004 | Mazur et al. | |

FOREIGN PATENT DOCUMENTS

| | | |
|---|---|---|
| EP | 1074833 | 2/2001 |
| EP | 1152137 | * 11/2001 |
| JP | 2003161145 | 6/2003 |

* cited by examiner

DIAGNOSIS METHOD FOR AN EXHAUST GAS POST-TREATMENT SYSTEM

BACKGROUND OF THE INVENTION

1. Field of the Invention

The invention relates to a method for diagnosing an exhaust gas treatment system for the reduction of nitrogen oxides in the exhaust gas train of an internal combustion engine by means of selective catalytic reduction, where a reducing agent is fed into the exhaust gas via a metering device, with at least one NOx-sensitive sensor located downstream of an exhaust gas treatment device, and further to a device for implementing the method. Furthermore, the invention relates to an internal combustion engine, in particular a diesel engine, with an exhaust train in which is located at least one exhaust gas treatment device, preferably a particulate filter, where regeneration of the exhaust gas treatment device may be initiated by increasing the exhaust gas temperature. The invention further relates to a method of operating an internal combustion engine.

2. The Prior Art

SCR-systems (Selective Catalytic Reduction) consist of a SCR-converter in the exhaust train of an internal combustion engine, which at sufficiently high temperatures catalyzes the reaction of nitrogen oxides (NOx) with a reducing agent, producing innocuous end products such as water and nitrogen. A system of this type comprises a container for the reducing agent, a metering device for the reducing agent, and an injection nozzle for the reducing agent, which injects the reducing agent into the exhaust gas before the SCR-converter. In practical applications an aqueous urea solution is commonly used as reducing agent, which at high temperatures in the SCR-converter releases ammonia (NH3) as the active substance.

The SCR-system is controlled by an electronic control unit ECU, which is either the control unit of the internal combustion engine itself or a separate control unit exchanging data with the control unit of the internal combustion engine. The control unit actuates the metering device for the reducing agent in such a way that the exhaust gas is supplied with the amount of reducing agent required for reducing the nitrogen oxides generated at the given operating point of the engine. In many cases a temperature sensor is provided in the exhaust train in order to ensure that the reducing agent is supplied only if the temperature of the SCR-converter is sufficiently high.

Since SCR-systems of this kind substantially reduce the amount of nitrogen oxides present in the exhaust train, it is necessary to monitor the correct functioning of the SCR-system as part of an "on-board diagnosis" program. In particular, it must be ascertained that the required amount of reducing agent has actually been supplied. Malfunctions which must be diagnosed are for instance clogging of the feeder nozzle or the filling of the reducing agent tank with liquids which do not have the required properties of a reducing agent, as for instance water without dissolved urea.

The objective of diagnosing an SCR-system could simply be achieved by providing a suitably sensitive NOx sensor downstream of the SCR-converter in the exhaust train, which transmits data on NOx concentration behind the SCR-converter to the control unit ECU. An arrangement of this kind is known from U.S. Pat. No. 6,363,771 B1. The sensitivity of commercially available NOx sensors is not sufficient, however, to perform the diagnosis task for all required engine operating points. If conventional NOx sensors are used, it may happen that in spite of a malfunction of the SCR-system leading to increased NOx concentration in the exhaust gas behind the SCR-converter, even this increased concentration will be too low for detection by the sensor so that the malfunction cannot be diagnosed.

From DE 102 61 877 A1 a method for operating an internal combustion engine with a particulate filter is known, wherein a particulate filter located in the exhaust train of the internal combustion engine is regenerated when necessary. During operation of the internal combustion engine a λ-value of a fuel-air mixture is changed periodically up and down over a predetermined period of time, between a value <1 and a value >1, such that the temperature of the particulate filter is increased by exhaust gas heating to a value at which regeneration of the particulate filter sets in.

JP 2003-161145 A discloses an exhaust gas treatment system with a $NO_x$ converter in the exhaust train and a throttle valve positioned downstream of the converter.

It is furthermore known to increase the temperature in the particulate filter by throttling the air mass flow in front of the intake manifold. This will reduce air throughput and excess air. With less excess air a given mass of fuel is burned with less air, thereby increasing the temperature of the combustion products. It is disadvantageous that throttling in front of the intake manifold will result in a considerable volume reduction, causing regeneration of the particulate filter to take longer.

It is the object of the present invention to describe a method which will permit diagnosis of exhaust gas treatment malfunctions even when $NO_x$-sensors of low sensitivity are used. A further aim of the invention is to propose a device and a method for regeneration of an exhaust gas treatment device with short duration of the regeneration process.

SUMMARY OF THE INVENTION

The invention achieves these aims by the following steps:
- defining at least one threshold value for $NO_x$ concentration for at least one operating point of the internal combustion engine;
- changing the operating state of the internal combustion engine from the usually prevailing normal operating state to a diagnostic operating state, with the generated amount of $NO_x$ emissions in the diagnostic operating state being at least twice, and preferably at least five times, and particularly preferably at least ten times that of the normal operating state;
- determining the amount of reducing agent corresponding to the increased $NO_x$ emissions of the diagnostic operating state;
- controlling the metering device in such a way that an amount of reducing agent corresponding to the increased $NO_x$ emissions of the diagnostic operating state is fed into the exhaust gas;
- measuring the $NO_x$ concentration downstream of the exhaust gas treatment device;
- comparing the measured $NO_x$ concentration with the threshold value;
- deciding whether the exhaust gas treatment system is operating properly or malfunctioning, based on the comparison between the measured $NO_x$ concentration and the threshold value;
- terminating the diagnostic operating state, with the internal combustion engine preferentially being switched back to the normal operating state or to a sensor diagnostic operating state for checking the proper functioning of the $NO_x$ sensitive sensor.

Proper functioning of the $NO_x$ sensitive sensor is checked by the following steps:

changing the operation of the internal combustion engine from the usually prevailing normal operating state or the diagnostic operating state to a sensor diagnostic operating state, with the generated amount of $NO_x$ emissions in the sensor diagnostic operating state exceeding that of the normal operating state, preferably at least twice, and more preferably at least five times, and particularly preferably at least ten times;

determining the amount of reducing agent corresponding to the increased $NO_x$ emissions of the sensor diagnostic operating state;

controlling the metering device in such a way that an amount of reducing agent is fed into the exhaust gas, which is less by a defined deficiency amount than that required for complete reduction of the $NO_x$ emissions, resulting in a $NO_x$ concentration downstream of the exhaust gas treatment device which is higher than the sensitivity threshold of the $NO_x$ sensitive sensor;

determining a residual $NO_x$ concentration based on the defined deficiency amount of reducing agent;

measuring the $NO_x$ concentration downstream of the exhaust gas treatment device by means of the $NO_x$ sensitive sensor;

comparing the measured $NO_x$ concentration with the determined residual $NO_x$ concentration;

deciding whether the $NO_x$ sensitive sensor downstream of the exhaust gas treatment system is functioning properly or malfunctioning;

terminating the sensor diagnostic operating state, preferentially switching back to the normal operating state.

During the diagnostic operating state or the sensor diagnostic operating state, NOx emissions are thus for a short time increased by a factor of roughly 2 to 10, as compared with the normal operating state, such that deficient reduction of nitrogen oxides can easily be detected even with NOx sensitive sensors of low sensitivity. Increased NOx emissions can be generated by diminishing the exhaust gas mass flow of recirculated exhaust gas, by reducing or at least partially bypassing the cooling of the exhaust gas mass flow cooled by an exhaust gas recirculation cooler, by increasing the boost pressure or by changing the injection timing or the injection pressure.

In order to ensure optimum reduction of nitrogen oxides, especially during the diagnostic operating state or the sensor diagnostic operating state, it will be of advantage if upstream of the exhaust gas treatment device $NO_x$-concentration is measured at least during the diagnostic or sensor diagnostic operating state, and the amount of reducing agent to be fed into the exhaust gas is determined using the $NO_x$-concentration measured upstream of the exhaust gas treatment device. In addition or as an alternative it may be provided that the amount of reducing agent to be fed into the exhaust gas at least during the diagnostic operating state or the sensor diagnostic operating state is determined with the use of a characteristic map and/or a model for determining the $NO_x$ emissions of the internal combustion engine.

Diagnosis may be carried out during normal operation of the internal combustion engine. In order to avoid deterioration of driving comfort during the diagnostic process, it may be provided that during the diagnostic operating state or the sensor diagnostic operating state the torque of the internal combustion engine is kept equal to the torque of the normal operating state by increasing the amount of fuel injected.

It is of particular advantage if switching from the normal operating state to the diagnostic or sensor diagnostic operating state occurs only if defined initial conditions, preferably as regards engine speed and/or torque of the internal combustion engine and/or temperature of the exhaust gas treatment system are satisfied. Catalytic reactions, for instance, will require a sufficiently high temperature of the exhaust treatment device. On the other hand, switching to a diagnostic state will only be necessary if $NO_x$ emissions in the normal operational state are so low that they cannot be measured reliably at the given sensitivity of the $NO_x$ sensitive sensor. Engine operating states of this kind with low $NO_x$ emission are usually characterised by low engine speed and/or low torque delivered by the engine.

In addition to the desired $NO_x$-sensitivity commercially available $NO_x$ sensors may have significant secondary sensitivity for ammonia and/or other chemical substances. The method presented here can in principle be employed with all sensors with sufficient $NO_x$-sensitivity, regardless of their secondary sensitivity. These sensors are designated $NO_x$-sensitive sensors in the context of this patent application.

The method can be used with an internal combustion engine having an exhaust gas treatment device with selective catalytic reduction in the exhaust train, with a metering device for the reducing agent upstream of the exhaust gas treatment device and with at least one sensor for measuring $NO_x$ concentration downstream of the exhaust gas treatment device.

A temperature sensor may be provided downstream of the exhaust gas treatment device for checking if the temperature of the exhaust gas and/or the exhaust gas treatment device is within a defined working range.

In order to match the amount of reducing agent added precisely with the amount of $NO_x$ emissions, it may be provided that a sensor for measuring $NO_x$ concentration is located upstream of the exhaust gas treatment device. In this case it is provided that the metering device is connected to a control unit, which controls the amount of added reducing agent depending on the actually measured $NO_x$ emissions of the internal combustion engine.

It is further provided by the invention that the internal combustion engine has at least one switching means controlled by the control unit for switching the internal combustion engine from a normal operating state to a diagnostic or sensor diagnostic operating state.

To keep regeneration times short it is provided that at least one variable throttle is positioned in the exhaust train. Advantageously the variable throttle is configured as a flap.

It is of advantage if the variable throttle is located upstream of the exhaust gas treatment device. The throttle may be located downstream of the turbine of an exhaust turbocharger.

To regenerate the exhaust gas treatment device the internal combustion engine switches to regeneration operation. In this mode the temperature behind the exhaust turbine must be increased, for instance to approximately 620° C., and a certain oxygen content in the exhaust gas, for instance 6%, must be maintained. The throttling device in the exhaust train will increase the exhaust counter pressure. This increases charge exchange work, with only a slight change in air mass flow. In order to maintain the torque the injected amount of fuel is increased, which leads to reduction of the air/fuel ratio and thus to a further temperature increase. Higher total mass flow as compared with throttling in the intake train, will substantially shorten the regeneration time of the exhaust gas treatment device. Furthermore, the influence on cylinder pressure is less pronounced than in the case of a throttle flap in the intake system, and thus switching will cause less change in engine noise.

The throttling device placed downstream of the turbine has the further advantage that the response of the internal combustion engine in transient operation is improved. In an acceleration process the throttle is opened, causing pressure at the turbine—and thus the power transmitted from the turbine to the compressor—to increase.

By raising the exhaust gas temperature this system will also accelerate warm-up of the internal combustion engine and thus improve the effectiveness of exhaust gas treatment devices, such as catalytic converters. A reduction of emissions over the driving cycle can thus be achieved.

In further development of the invention it may be provided that the variable throttling device is positioned downstream of the branch-off of an exhaust recirculation line from the exhaust train. This will permit to control the exhaust gas recirculation rate during normal operation and to increase it even more than in the case of throttling in the intake system. A throttle flap in the intake system may thus be completely replaced by a throttle flap in the exhaust system.

The invention will now be described in more detail with reference to the enclosed drawings.

DETAILED DESCRIPTION OF THE PREFERRED EMBODIMENT

Functionally equivalent parts are indicated by the same reference numbers in all variants.

Figure 1:
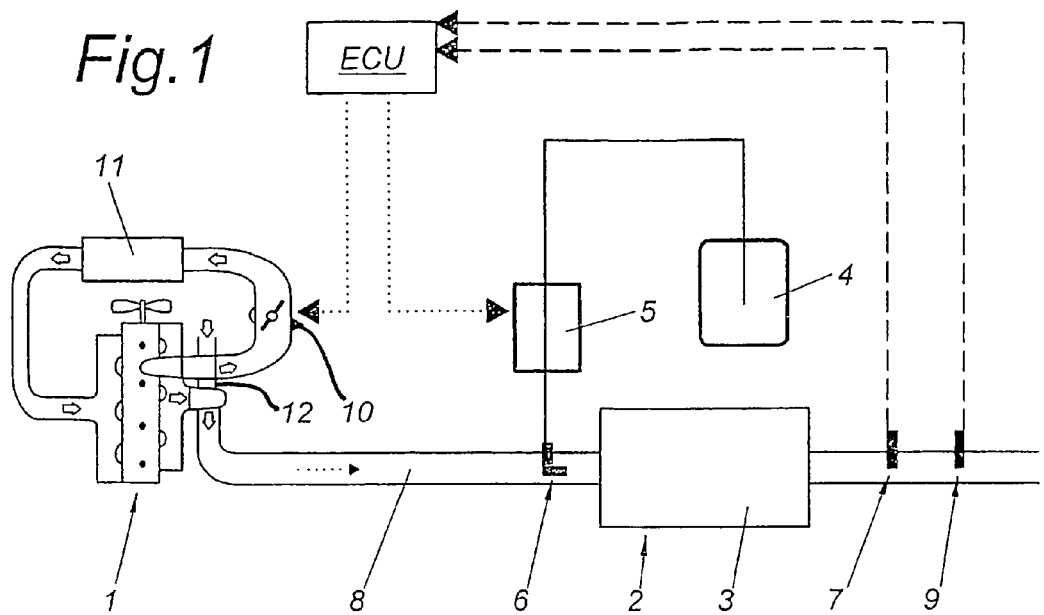
FIG. 1 shows a first variant of the invention.

A first variant of the invention is shown in FIG. 1. The internal combustion engine 1 is equipped with an exhaust gas treatment device 2 consisting of an SCR catalytic converter 3, a tank 4 for a reducing agent, a metering device 5 for the reducing agent and an injection nozzle 6 for the reducing agent. The metering device 5 for the reducing agent is controlled by an electronic control unit ECU, which may be identical with the control unit of the internal combustion engine 1 or may be a separate control unit exchanging data with the control unit of the internal combustion engine 1. In the exhaust train there is located at least one temperature sensor 7 before or behind the SCR catalytic converter 3, which signals the temperature of the SCR catalytic converter 3 to the control unit ECU. A sensor 9 for measuring the concentration of nitrogen oxides ($NO_x$) is also located in the exhaust train 8 behind the SCR catalytic converter 3, and is connected to the control unit ECU.

Figure 2:
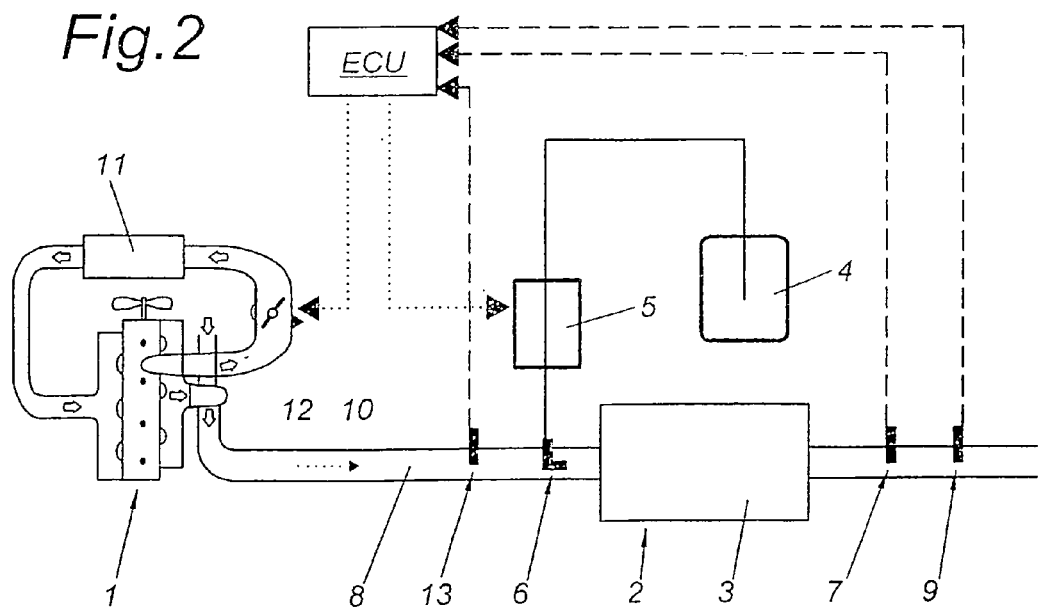
FIG. 2 shows a second variant of the invention.

Furthermore, the control unit ECU can actuate control elements of the internal combustion engine 1, which switch the internal combustion engine 1 to an operating state with increased $NO_x$ emission. As an example an exhaust gas recirculation valve 10 (EGR-valve) controlling the recirculated exhaust gas mass flow is shown in FIGS. 1 and 2. By decreasing the exhaust gas mass flow as compared with normal operation of the engine, the nitrogen oxide emission of the internal combustion engine 1 is increased.

In many internal combustion engines 1 the recirculated exhaust gas mass flow is cooled by an EGR-cooler 11 in order to further reduce the formation of nitrogen oxides. If it is possible for the control unit ECU to reduce the cooling of the recirculated exhaust gas mass flow or to partially bypass the cooler, an operating state with higher $NO_x$ emissions may be entered in this way.

Furthermore, many internal combustion engines 1 are equipped with compressors or turbochargers 12 for increasing the boost pressure, which can also be influenced by the control unit ECU in many instances. In these cases an increase in boost pressure may lead to the desired operational state with higher $NO_x$ emission.

Since the nitrogen oxide emissions of the internal combustion engine 1 largely depend on the correct choice of the time at which fuel injection occurs as well as on the fuel injection pressure, adjustment of these two parameters via the control unit ECU can also be used to switch to an operational state with higher $NO_x$ emissions. Fuel injection systems which are capable of more than one fuel injection into the combustion chamber per working cycle, offer a large range of possibilities in this context.

The measures described above permit an increase of $NO_x$ emissions of the internal combustion engine 1 by a factor of 5 to 10 as compared with normal operation.

Since the above measures for switching to a diagnostic operational state with increased $NO_x$ emission will usually cause a change in efficiency of the internal combustion engine 1, it is of particular advantage if the transition to an operational state with increased $NO_x$ emissions is coupled with adjusting the injected amount of fuel in such a way that the torque delivered by the internal combustion engine 1 is kept constant when the operational state changes.

While the internal combustion engine 1 is in a diagnostic operational state with increased $NO_x$ emissions, the control unit ECU actuates the metering unit 5 for the reducing agent in such a way that the exhaust gas is supplied with an amount of reducing agent sufficient to completely reduce the increased $NO_x$ emissions in the SCR catalytic converter 3. To this end the amount or concentration of $NO_x$ in the exhaust gas is first determined for the diagnostic operational state, and the required amount of reducing agent is derived therefrom. Advantageously, a computational formula, a table or a characteristic curve is stored in the control unit ECU, which associates the $NO_x$ emission of the internal combustion engine 1 with a corresponding amount of reducing agent.

In the simple embodiment shown in FIG. 1 it is provided that a characteristic map or a model is stored in the control unit ECU, which determines $NO_x$ emissions as a function of operational parameters (engine speed, torque, EGR-rate, EGR-cooling, boost pressure, injection timing and/or injection pressure).

In another embodiment, which is shown in FIG. 2, a further $NO_x$ sensitive sensor 13 is used instead, in this case upstream of the SCR catalytic converter 3, to measure $NO_x$ emissions. Since $NO_x$ emissions are increased this sensor 13 requires only low sensitivity for measuring the $NO_x$ emissions with sufficient accuracy.

If the exhaust gas treatment device 2 functions properly, the amount of reducing agent corresponding to the measured $NO_x$ emssions and fed into the exhaust gas will result in a very low $NO_x$ concentration behind the SCR catalytic converter 3, which in many cases will be below the sensitivity threshold of the $NO_x$ sensitive sensor 9. If however a malfunction occurs, for instance due to at least partial clogging of the reducing agent injection nozzle 6, or if another medium instead of the prescribed reducing agent is injected, the $NO_x$ concentration in the operational state with increased $NO_x$ emissions will still be high enough behind the SCR catalytic converter to be measured even by a $NO_x$ sensitive sensor 9 with low sensitivity. In this case the method of the invention will diagnose a malfunction state, which may further be handled by other system components which are not part of this invention.

It will be of special advantage if the diagnostic operational state with increased $NO_x$ emissions is only entered if certain preconditions are met. In particular, one of these pre-conditions is that the temperature of the SCR catalytic converter 3 is sufficiently high for the catalytic reaction to occur. It is also advantageous to switch to diagnostic operational states with increased $NO_x$ emissions for diagnosis purposes only if $NO_x$ emissions in normal operation are too low to be measured reliably at the given sensitivity of the $NO_x$ sensitive sensor 9. Operational states of the engine with such low $NO_x$ emissions are usually characterised by low engine speed and/or low torque delivered by the internal combustion engine 1.

Figure 3:
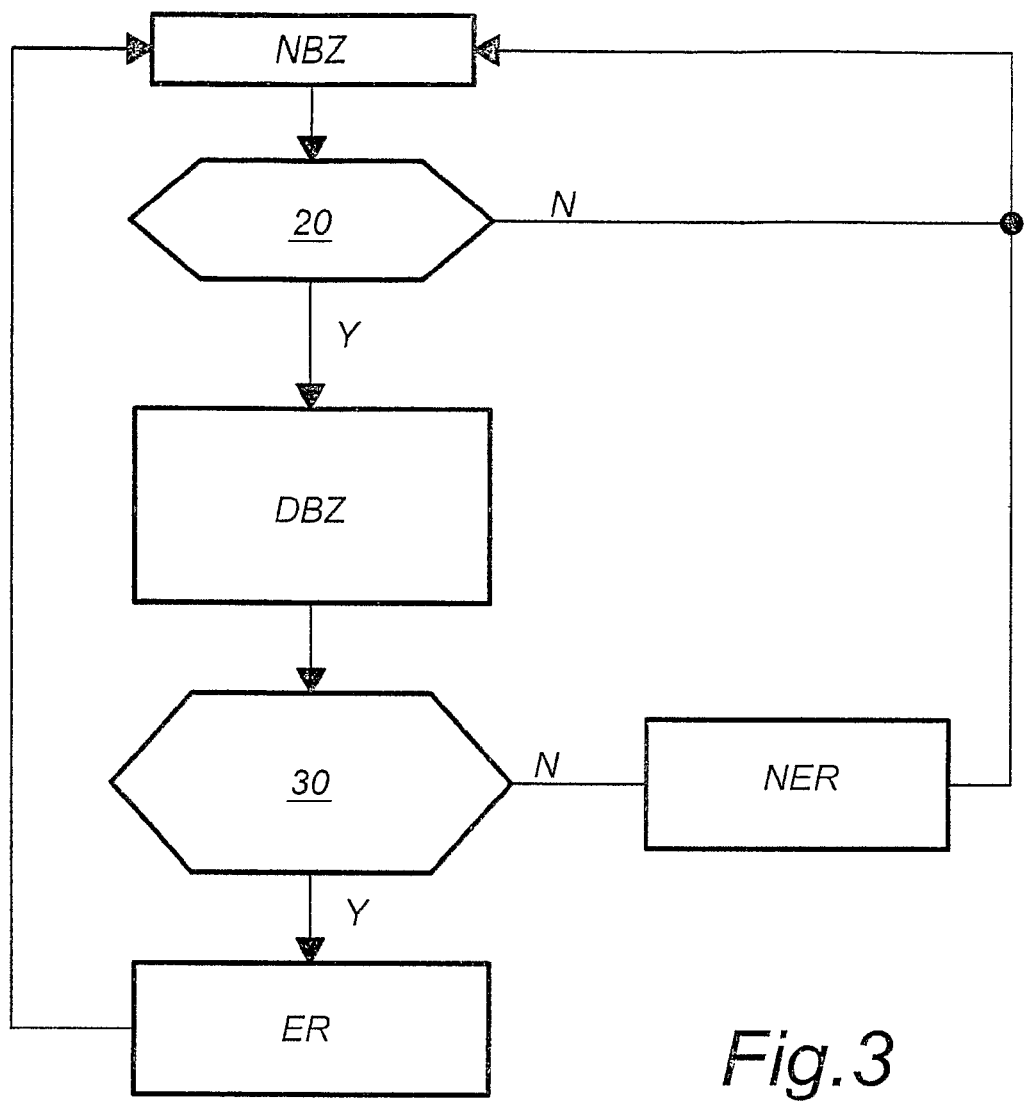
FIG. 3 is a flow chart of the method of the invention.

FIG. 3 shows a flow chart of the procedure of the invention in simplified form. Departing from the normal operational state NBZ step 20 checks periodically if conditions for switching to the diagnostic operational state DBZ with increased $NO_x$ emissions are fulfilled. This check in step 20 may for instance take into account the temperature of the SCR catalytic converter 3 and engine speed and/or the torque of the internal combustion engine.

If the diagnosis conditions of step 20 are not fulfilled (N), the internal combustion engine remains in the normal operational state NBZ, otherwise (Y) it is switched to the diagnostic operational state DBZ with increased $NO_x$ emissions. The switch can be brought about by modifying the EGR-rate and/or EGR-cooling and/or boost pressure and/or injection timing and/or injection pressure. Here it is of advantage to modify the amount of injected fuel in such a way that the torque delivered by the internal combustion engine 1 is not changed by the switching. Using a model or a characteristic map or a second $NO_x$ sensor 13 the amount of $NO_x$ emissions in the new operating point is determined and the metering unit 5 for the reducing agent is instructed to feed the amount of reducing agent required for total reduction of the $NO_x$ emissions into the exhaust gas.

In a final step 30 it is checked whether the concentration of nitrogen oxides in the exhaust gas measured by the $NO_x$ sensitive sensor 9 behind the SCR catalytic converter 3 exceeds a certain threshold value. The threshold value may be a constant or may depend on operational parameters such as engine speed and/or torque of the internal combustion engine 1 and/or the measured and/or estimated $NO_x$ concentration before the SCR catalytic converter 3. If the $NO_x$ concentration measured by the $NO_x$ sensitive sensor 9 is less than or equal to the threshold value, a "No Error state" NER is signalled to other components of the diagnosis system and the internal combustion engine 1 is switched back to the normal operational state NBZ. If the measured $NO_x$ concentration is greater than the threshold value an "Error state" ER is signalled to other components of the diagnosis system and the internal combustion engine 1 again reverts to the normal operational state NBZ.

With only slight modification the method of the invention may also be used to check the proper functioning of an $NO_x$ sensitive sensor downstream of the exhaust gas treatment system, in particular the $NO_x$ sensitive sensor 9 used for diagnosis of the exhaust gas treatment system. For this purpose, as described above, a switch to a sensor diagnostic state with increased $NO_x$ emissions is carried out if defined conditions are fulfilled. The amount of reducing agent fed into the exhaust gas is however not increased to the value which would be required for total reduction of the increased $NO_x$ emissions, but is increased only slightly, or not at all, or even decreased, resulting in a significant increase of the $NO_x$ concentration behind the SCR catalytic converter 3, which exceeds the sensitivity threshold of the $NO_x$ sensitive sensor 9. In this case a properly functioning $NO_x$ sensitive sensor must signal the increased $NO_x$ concentration. If increased $NO_x$ concentration is not signalled, a malfunction of the $NO_x$ sensitive sensor 9 can be inferred.

The diagnosis results of the exhaust gas treatment system and/or the results of diagnosing the $NO_x$ sensitive sensor may for instance be stored in an error-log memory. Furthermore it is possible to indicate a malfunction by turning on a malfunction indicator light.

The method of the invention may be used for diesel engines as well as for spark ignited engines.

Figure 4:
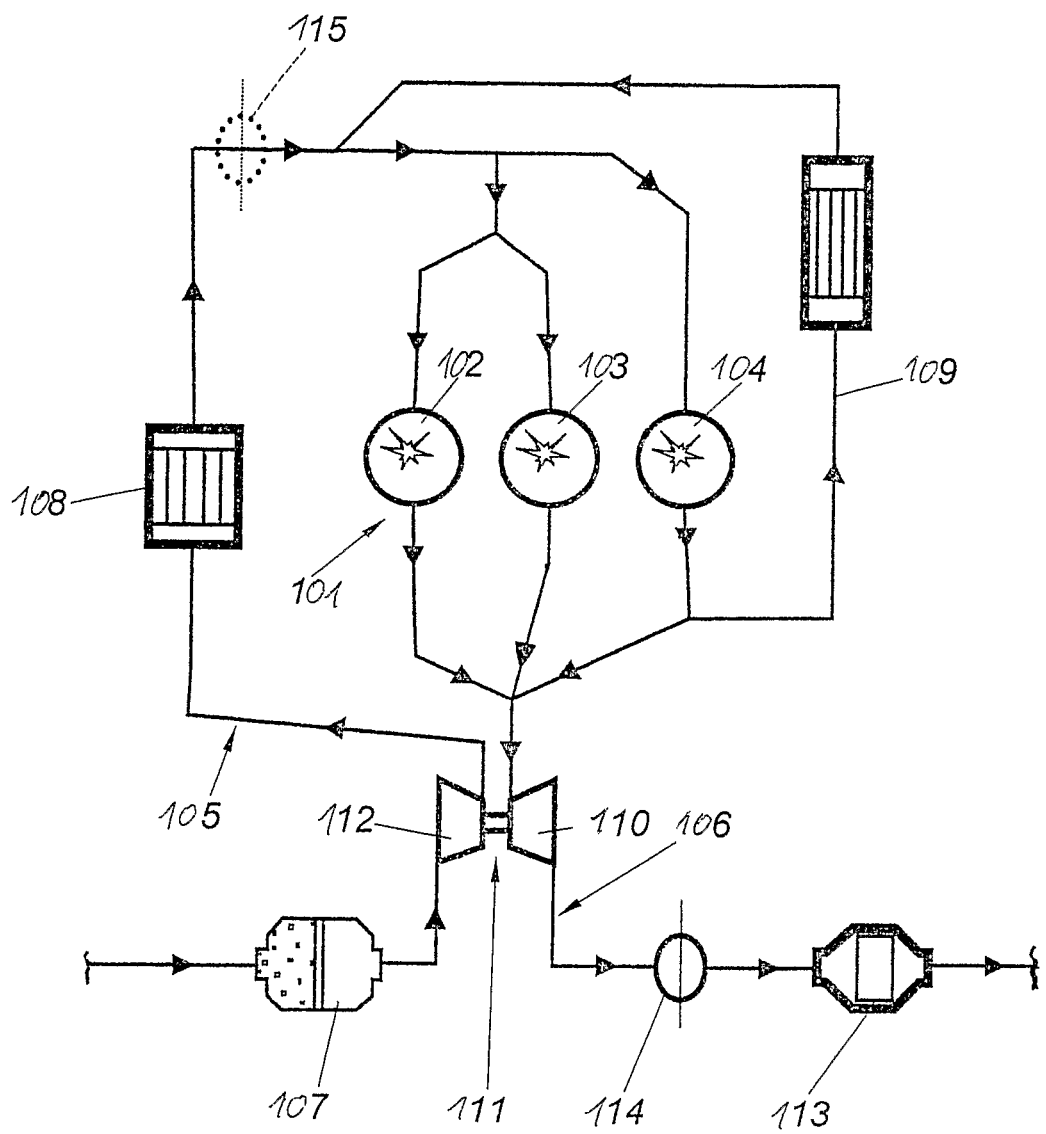
FIG. 4 is a schematic view of an internal combustion engine according to the invention.

FIG. 4 shows an internal combustion engine 101 with a number of cylinders 102, 103, 104, and an intake train 105, and an exhaust train 106. A charge-air filter 107 and a charge-air cooler 108 are located in the intake train. The exhaust system 106 and the intake system 105 are connected via an exhaust gas recirculation line 109, which branches off the exhaust train 106 upstream of the turbine 110 of an exhaust gas turbocharger 111. Numeral 112 refers to the compressor of the exhaust gas turbocharger 111.

Downstream of the turbine 110 an exhaust gas treatment device 113 is provided, for instance a particulate filter. Between the turbine 110 and the exhaust gas treatment device 113 a throttling device 114 configured as a flap is provided in the exhaust train 106. When the exhaust gas treatment device 113 is to be regenerated the internal combustion engine 101 is switched to regeneration operation. In this instance the temperature behind the turbine 110 must be raised to e.g. 620° C., while the oxygen content of the exhaust gas must not drop below approximately 6% and the engine torque should be kept constant. To this end the throttling device 114 in the exhaust train 106 is at least partially closed. This causes the exhaust gas counter pressure to rise and thus increases the charge exchange work of the internal combustion engine 101. This will lead only to a slight change of air mass flow, as compared with the effect of a throttling device bearing the reference numeral 115 in the intake train 105. The injected amount of fuel is increased in order to keep torque constant, leading to a lower air/fuel ratio and thus a temperature increase. Due to higher total mass flow, as compared with a throttle in the intake train, regeneration time of the exhaust gas treatment device 113 is substantially shortened. Moreover, influence on the pressure curve in the cylinders 102, 103, 104 is less than that of a throttling device 115 in the intake train 105, and thus switching from normal engine operation to regeneration operation causes less change in engine noise. A further advantageous effect concerns the transient behaviour of the internal combustion engine 101. During acceleration the throttle 114 is opened, increasing the pressure ratio at the turbine 110 and thus the power transmitted from the turbine 110 to the compressor 112. The throttling device 114 in the exhaust system 106 can also be used to raise the exhaust gas recirculation rate during normal operation—again as compared with a throttling device 115 in the intake system 105.

The invention claimed is:

1. A method for diagnosing an exhaust gas treatment system for reduction of nitrogen oxides in an exhaust gas train of an internal combustion engine by means of selective catalytic reduction, where a reducing agent is fed into exhaust gas via a metering device, with at least one $NO_x$-sensitive sensor located downstream of an exhaust gas treatment device, comprising the following steps:
defining at least one threshold value for $NO_x$ concentration for at least one operating point of the internal combustion engine;
changing an operating state of the internal combustion engine from a usually prevailing normal operating state to a diagnostic operating state, a generated amount of $NO_x$ emissions in a diagnostic operating state being at least twice that of the normal operating state;

determining the amount of reducing agent corresponding to the increased $NO_x$ emissions of the diagnostic operating state;

controlling the metering device in such a way that an amount of reducing agent corresponding to the increased $NO_x$ emissions of the diagnostic operating state is fed into the exhaust gas;

measuring a $NO_x$ concentration downstream of an exhaust gas treatment device;

comparing the measured $NO_x$ concentration to the threshold value;

deciding whether the exhaust gas treatment system is operating properly or malfunctioning, based on a comparison between the measured $NO_x$ concentration and the threshold value; and terminating the diagnostic operating state, with the internal combustion engine being switched back to the normal operating state or to a sensor diagnostic operating state for checking the proper functioning of the $NO_x$ sensitive sensor.

2. In an internal combustion engine which includes an exhaust gas train with an exhaust gas treatment device providing selective catalytic reduction, a metering device for discharging reducing agent in the exhaust gas upstream of the exhaust gas treatment device, and a first sensor for measuring $NO_x$ concentration located downstream of the exhaust gas treatment device, the improvement comprising an actuating means for switching the internal combustion engine from a normal operating state to a diagnostic operating state wherein $NO_x$ emissions in the exhaust gas are at least doubled, and a control unit for controlling said actuating means.

3. A device according to claim 2, including a temperature sensor downstream of the exhaust gas treatment device.

4. A device according to claim 2, including a second sensor for measuring $NO_x$ concentration located upstream of the exhaust gas treatment device.

5. A device according to claim 2, wherein the control unit is connected to the metering device.

6. The internal combustion engine according to claim 2, wherein said internal combustion engine includes an exhaust gas recirculation line, and said actuating means comprises a flow valve in said recirculation line.

\* \* \* \* \*